(12) United States Patent
Panchal

(10) Patent No.: US 11,392,581 B2
(45) Date of Patent: Jul. 19, 2022

(54) SYSTEM AND METHOD FOR PROVIDING DYNAMICALLY GROUPED SEARCH RESULTS FROM A HIERARCHY

(71) Applicant: salesforce.com, inc., San Francisco, CA (US)

(72) Inventor: Nishant Panchal, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/775,037

(22) Filed: Jan. 28, 2020

(65) Prior Publication Data
US 2021/0232576 A1    Jul. 29, 2021

(51) Int. Cl.
  *G06F 16/242*   (2019.01)
  *G06F 3/04817*  (2022.01)
  *G06F 3/0482*   (2013.01)
  *G06F 16/2457*  (2019.01)

(52) U.S. Cl.
  CPC ........ *G06F 16/2423* (2019.01); *G06F 3/0482* (2013.01); *G06F 3/04817* (2013.01); *G06F 16/24578* (2019.01)

(58) Field of Classification Search
  CPC .................................................. G06F 16/2423
  See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,956,715 A * | 9/1999 | Glasser ................... H04L 63/20 |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |

(Continued)

*Primary Examiner* — Roland J Casillas
(74) *Attorney, Agent, or Firm* — LKGlobal | Lorenz & Kopf, LLP

(57) ABSTRACT

A selection system for a database (DB) of items having a hierarchical order is disclosed. The selection system is configured to: provide a user interface (UI) that includes a configuration item (CI) search component, a CI hierarchy display component, and a CI lock display component; cause a plurality of CIs from the DB to be displayed in hierarchical order in the CI hierarchy display component, including an expansion widget for each displayed CI that is in a hierarchical path of a lower level CI wherein each expansion widget when selected causes the next level of CIs in the hierarchy to be displayed, and a CI selection widget for each displayed CI wherein when selected displays a visual indication that the CI associated with the selected CI selection widget has been selected and causes an identifier for the CI associated with the selected CI selection widget to be displayed in the CI lock display component.

20 Claims, 10 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0115458 A1* | 6/2003 | Song ............... G06F 21/54 713/165 |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0207666 A1* | 10/2004 | Hally ............... G06F 3/0481 715/854 |
| 2004/0249854 A1 | 12/2004 | Barnes-Leon et al. |
| 2004/0260534 A1 | 12/2004 | Pak et al. |
| 2004/0260659 A1 | 12/2004 | Ohan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2009/0307306 A1* | 12/2009 | Jalon ............... G06F 16/14 709/203 |
| 2011/0247051 A1 | 10/2011 | Bulumulla et al. |
| 2012/0042218 A1 | 2/2012 | Cinarkaya et al. |
| 2012/0110445 A1* | 5/2012 | Greenspan ............ G06F 40/197 715/256 |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2015/0033327 A1* | 1/2015 | Naglost ............ H04L 63/101 726/17 |
| 2015/0199367 A1* | 7/2015 | Hammer ............ G06F 11/1448 707/654 |

* cited by examiner

SYSTEM AND METHOD FOR PROVIDING DYNAMICALLY GROUPED SEARCH RESULTS FROM A HIERARCHY

TECHNICAL FIELD

Embodiments of the subject matter described herein relate generally to maintenance of computing systems, and more particularly to systems and methods for managing changes to infrastructure in computing systems.

BACKGROUND

Many enterprises use cloud-based services and infrastructure for computing needs. Cloud-based service providers often support multiple enterprises (or tenants) using common computer hardware and data storage. Customers of a cloud-based service provider need to trust that they can run their business on the cloud-based platform with consistency and predictability. Incidents are events in the infrastructure of the cloud-based platform wherein one or more customers experience degradation or unavailability of service. A large percentage of incidents occur when multiple service owners (e.g., senior or higher level developers at the cloud-based service provider) attempt to institute changes to the infrastructure or services at the same time.

Accordingly, it is desirable to provide systems and methods for reducing incidents caused by concurrent changes to components of the infrastructure or services. Furthermore, other desirable features and characteristics of the present disclosure will become apparent from the subsequent detailed description and the appended claims, taken in conjunction with the accompanying drawings and the background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

SUMMARY

Figure 1:
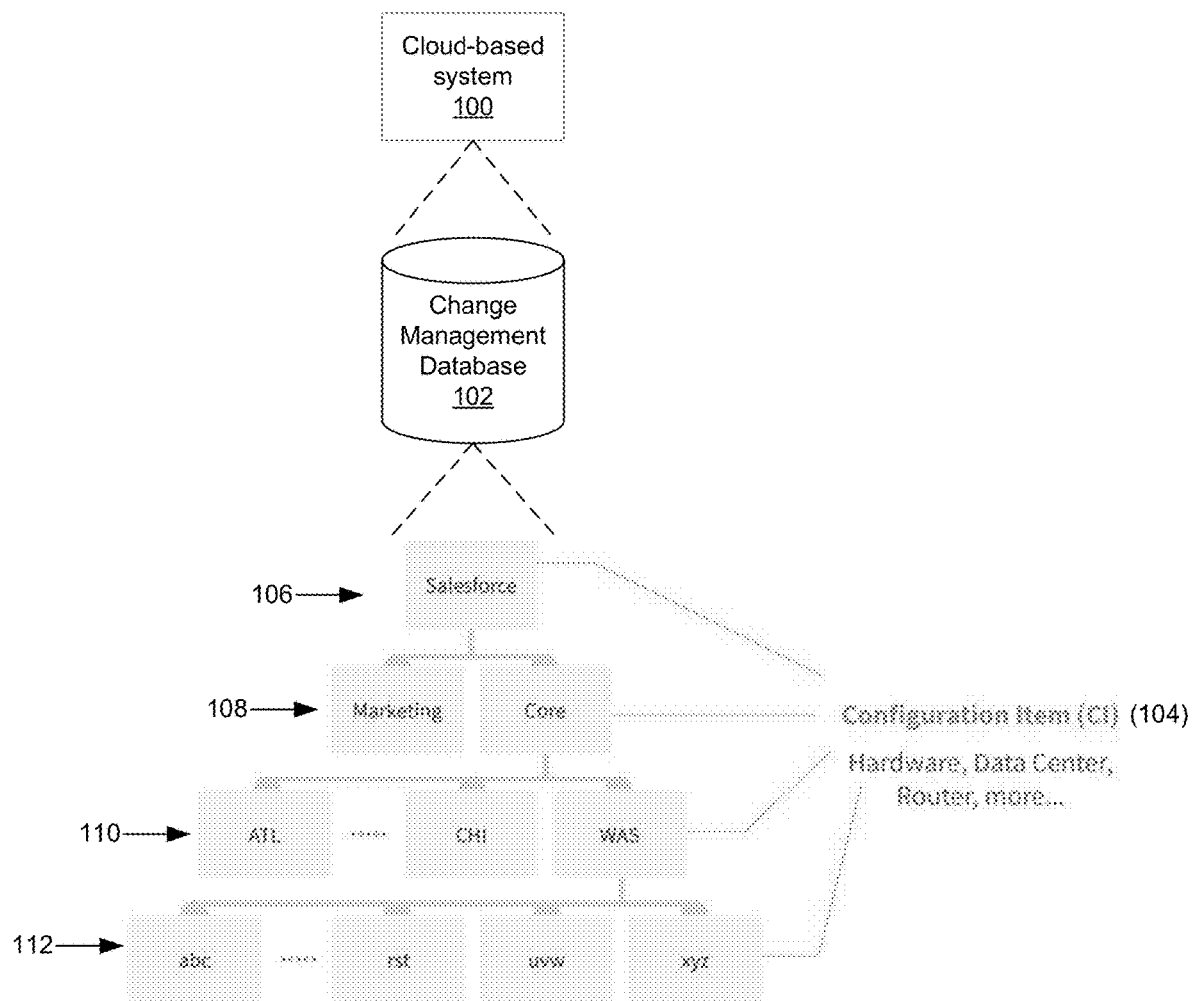
FIG. 1 is a block diagram depicting an example cloud-based system for providing computing services to multiple tenants using common computer hardware, software and data storage, in accordance with some embodiments.

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a selection system for selecting specific configuration items in a database of items having a hierarchical order is provided. The selection system includes a controller configured to: provide a user interface (UI) for use with a user computing device, wherein the UI includes a configuration item (CI) search component, a CI hierarchy display component, and a CI lock display component; cause a plurality of CIs from a database (DB) to be displayed in hierarchical order in the CI hierarchy display component, including a top level of the hierarchy, an expansion widget for each displayed CI that is in a hierarchical path of a lower level CI wherein each expansion widget when selected causes the next level of CIs in the hierarchy below the CI associated with the expansion widget to be displayed within the CI display component and when unselected prevents the next level of CIs below the CI associated with the expansion widget from being displayed, and a CI selection widget for each displayed CI wherein each CI selection widget when selected displays a visual indication that indicates that the CI associated with the selected CI selection widget has been selected and causes an identifier for the CI associated with the selected CI selection widget to be displayed in the CI lock display component; receive a selection of a CI selection widget; cause a visual indication to be displayed in the selected CI selection widget that indicates that the CI associated with the selected CI selection widget has been selected; cause an identifier for the CI associated with the selected CI selection widget to be displayed in the CI lock display component; and request that a lock status be placed on each CI identified in the CI lock display component.

In another embodiment, a processor-implemented method of selecting specific configuration items in a database (DB) of items having a hierarchical order is provided. The method includes: providing, by a processor, a user interface (UI) for use with a user computing device, wherein the UI includes a configuration item (CI) search component, a CI hierarchy display component, and a CI lock display component; causing, by the processor, a plurality of CIs from the DB to be displayed in hierarchical order in the CI hierarchy display component, including a top level of the hierarchy, an expansion widget for each displayed CI that is in a hierarchical path of a lower level CI wherein each expansion widget when selected causes the next level of CIs in the hierarchy below the CI associated with the expansion widget to be displayed within the CI display component and when unselected prevents the next level of CIs below the CI associated with the expansion widget from being displayed, and a CI selection widget for each displayed CI wherein each CI selection widget when selected displays a visual indication that indicates that the CI associated with the selected CI selection widget has been selected and causes an identifier for the CI associated with the selected CI selection widget to be displayed in the CI lock display component; receiving, by the processor, a selection of a CI selection widget; causing, by the processor, a visual indication to be displayed in the selected CI selection widget that indicates that the CI associated with the selected CI selection widget has been selected; causing, by the processor, an identifier for the CI associated with the selected CI selection widget to be displayed in the CI lock display component; and requesting, by the processor, that a lock status be placed on each CI identified in the CI lock display component.

In another embodiment, non-transitory computer readable media encoded with programming instructions configurable to cause one or more processors to perform a method of selecting specific configuration items in a database (DB) of items having a hierarchical order is provided. The method comprises: providing, by a processor, a user interface (UI) for use with a user computing device, wherein the UI includes a configuration item (CI) search component, a CI hierarchy display component, and a CI lock display component; causing, by the processor, a plurality of CIs from the DB to be displayed in hierarchical order in the CI hierarchy display component, including a top level of the hierarchy, an expansion widget for each displayed CI that is in a hierarchical path of a lower level CI wherein each expansion widget when selected causes the next level of CIs in the hierarchy below the CI associated with the expansion widget to be displayed within the CI display component and when unselected prevents the next level of CIs below the CI associated with the expansion widget from being displayed, and a CI selection widget for each displayed CI wherein each CI selection widget when selected displays a visual indication that indicates that the CI associated with the selected CI selection widget has been selected and causes an identifier for the CI associated with the selected CI selection widget to be displayed in the CI lock display component; receiving, by the processor, a selection of a CI selection widget; causing, by the processor, a visual indication to be displayed in the selected CI selection widget that indicates that the CI associated with the selected CI selection widget has been selected; causing, by the processor, an identifier for the CI associated with the selected CI selection widget to be displayed in the CI lock display component; and requesting, by the processor, that a lock status be placed on each CI identified in the CI lock display component.

Furthermore, other desirable features and characteristics will become apparent from the subsequent detailed description and the appended claims, taken in conjunction with the accompanying drawings and the preceding background.

DETAILED DESCRIPTION

The following disclosure provides many different embodiments, or examples, for implementing different features of the provided subject matter. The following detailed description is merely exemplary in nature and is not intended to limit the invention or the application and uses of the invention. Furthermore, there is no intention to be bound by any theory presented in the preceding background or the following detailed description.

FIG. 1 is a block diagram depicting an example cloud-based system 100 for providing computing services to multiple tenants using common computer hardware, software and data storage. The example cloud-based system 100 models hardware (e.g., data center, router, and other items) and software items within its infrastructure using a change management database 102. The Change Management Database (CMDB) 102 comprises a hierarchy of configuration items (CI) 104. Each CI 104 represents a hardware or service module within the infrastructure of the cloud-based system on which a service owner (e.g., senior or higher level developer) can implement their changes. A change can be a software upgrade, security patching, network update, a hardware upgrade, or any other implementation required to individual modules in the infrastructure. Each change incorporates one implementation. When changes are to be made to a hardware or service module, a service owner wishing to implement the change can request that a lock be placed on the affected hardware or service module to prevent others from simultaneously implementing changes. Placing a lock can involve identifying, in the change management database 102, the configuration item(s) 104 associated with the hardware and/or service module on which the lock is to be placed and requesting that the lock be placed on the identified configuration item 104. Because the cloud-based system can have a large number of hardware or service modules, the change management database 102 can include a large number of configuration items 104. Searching through the change management database 102 for a specific configuration item 104 may be cumbersome due to the large number of configuration items 104. The apparatus, systems, techniques and articles described herein provide an improved way to search for specific configuration items 104 on which a service owner may want to place a lock to prevent others from making changes to a hardware or service module while the service owner makes changes. The described apparatus, systems, techniques and articles can provide for dynamically grouping search results from a hierarchical arrangement of configuration items 104. The described apparatus, systems, techniques and articles can provide a user interface for simplifying searching for and designating configuration items on which a lock is to be placed.

Shown is an example hierarchy of configuration items (CIs). The configuration items are arranged in a hierarchical structure having a top level 106, intermediate levels 108, 110, and lower levels 112. In this example, a salesforce CI is at the top level 106 and a Core CI is at an intermediate level 108. Underneath the Core CI are an ATL CI, a CHI CI, and a WAS CI at another intermediate level 110. Underneath the WAS CI is a number of different CIs in a lower level 112.

Figure 2A:
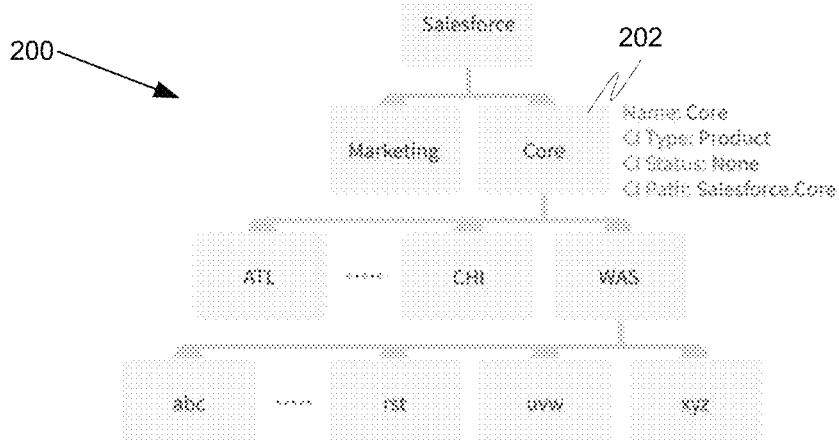
FIGS. 2A, 2B and 2C are diagrams of an example change management database hierarchy that illustrate example configuration item (CI) attributes in the change management database, in accordance with some embodiments.
Figure 2B:
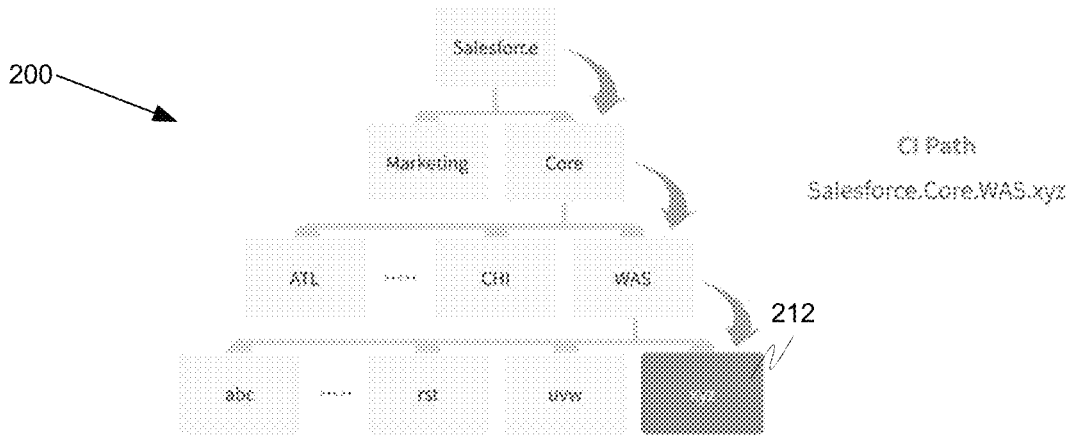
Figure 2C:
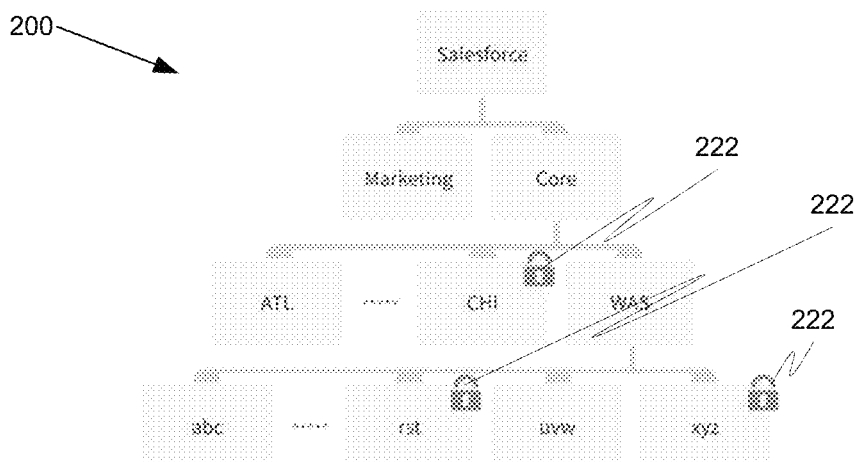

FIGS. 2A, 2B and 2C are diagrams of an example change management database hierarchy 200 that illustrate example CI attributes in the change management database 102. In the example of FIG. 2A, each CI attribute has a CI Name, CI Type, Status and a unique CI Path. The CI Path can be used to identify unique groupings of CIs within search results since it can accurately determine the hierarchy. In the illustrated example, the example CI 202 has the CI name: Core, CI type: product, CI status: none, and CI path: Salesforce.Core.

The CI path includes the CI name of the CI as well as dot separated CI names of the other CIs in the hierarchical path of the CI. The CI path is illustrated in the example of FIG. 2B. In this example, the CI path for the xyz CI 212 is Salesforce.Core.WAS.xyz.

The example of FIG. 2C illustrates that for a service owner to place a lock on a CI, it must search for a Configuration Item (CI) within the CMDB, navigate through the results and select one or more CI(s) to place a lock 222 on the CI to implement the changes without any disruptions. A lock 222 on the CI gives exclusive access to the service owner to implement their changes without any other changes interrupting the execution. From a design point of view, it can be a challenge to structure search results from the hierarchy in a way that allows quick navigation, promotes understandability and allow quick decision making to select CIs.

Figure 3:
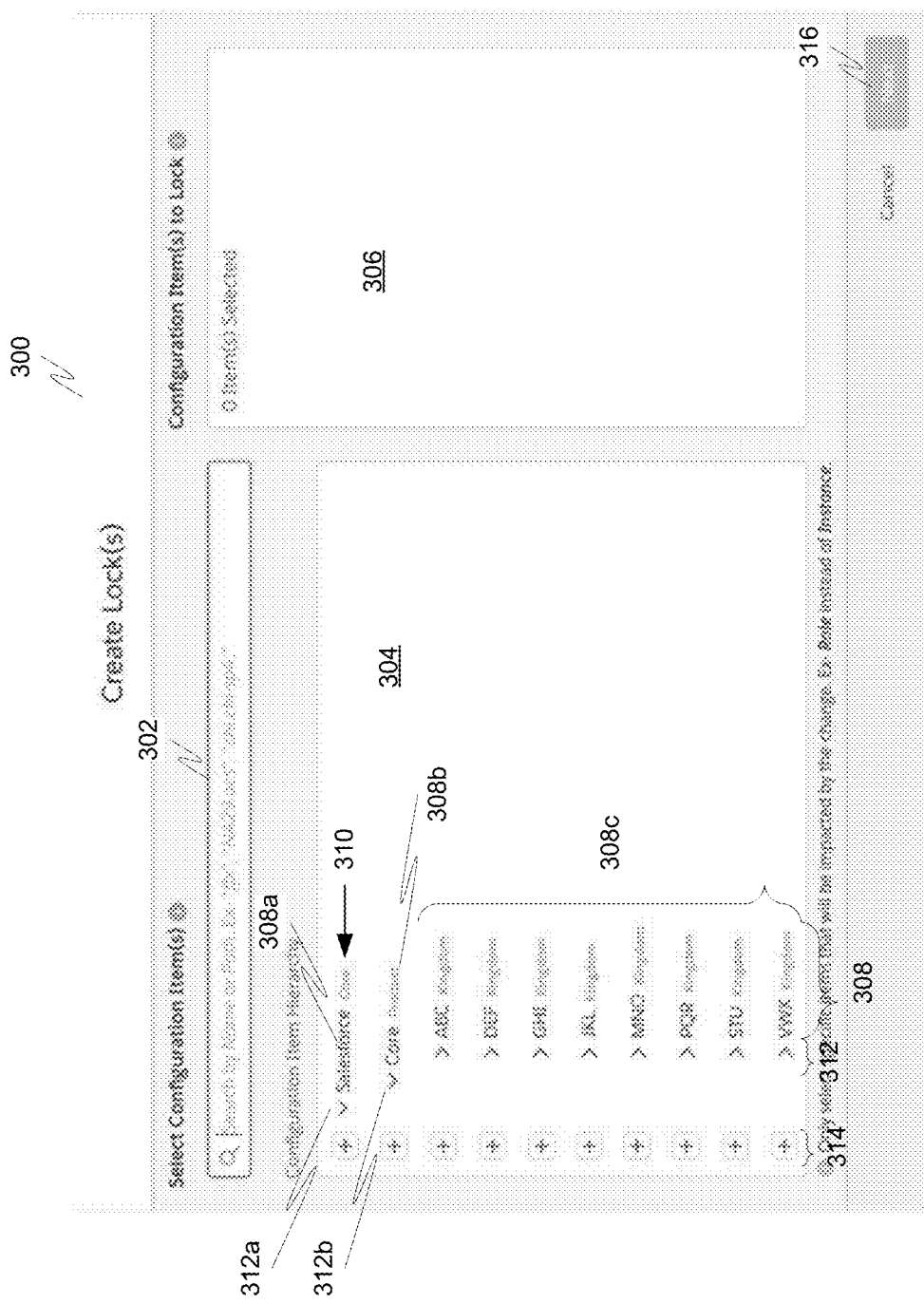
FIG. 3 is a diagram depicting an example user interface provided by a selection system for use by a service owner to select specific configuration items in a change management database having a hierarchical order, in accordance with some embodiments.

FIG. 3 is a diagram depicting an example user interface 300 provided by a selection system for use by a service owner in a computing system to select specific configuration items in a change management database having a hierarchical order. The selection system comprises a controller configured to provide the example user interface 300 for a service owner to use on a computing device to identify and select one or more configuration items on which to place a lock when attempting to administer changes to one or more configuration items to prevent others from making simultaneous changes to the same one or more configuration items. The example user interface 300 includes a configuration item search component 302, a configuration item hierarchy display component 304, and a configuration item lock display component 306.

The example controller includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The controller is configured to use the configuration item search component 302 to receive a search term entered via the configuration item search component 302, display the received search term in the configuration item search component 302, and initiate a search for a configuration item corresponding to the search term within the change management database.

The controller is also configured to cause the configuration item display component 304 to display configuration items 308 in hierarchical order beginning with the top level 310 of the hierarchy, an expansion widget 312 associated with each configuration item 308 that has an associated lower level CI wherein the expansion widget 312 when selected causes the next level of configuration items below the associated configuration item in the hierarchy to be displayed within the configuration item display component 304 and that when unselected prevents the next level of configuration items below the associated configuration item in the hierarchy from being displayed. In this example, the expansion widget 312a associated with the configuration item 308a on the top level 310 has been selected resulting in the configuration item 308b being displayed in the configuration item hierarchy display 304 in the next lower level (e.g., $2^{nd}$ level) from the top level configuration item 308a. Also, the expansion widget 312b associated with the configuration item 308b on the $2^{nd}$ level has been selected resulting in the configuration items 308c in the configuration item hierarchy display 304 being displayed in the next lower level from the $2^{nd}$ level configuration item 308b.

The controller is further configured to cause the configuration item display component 304 to display a configuration item selection widget 314 associated with each configuration item 308 that when selected provides a visual indication that the associated configuration item 308 has been selected and causes the configuration item lock display component 306 to display an identifier for the selected configuration item.

The controller is additionally configured to cause the configuration item display component 304 to display a configuration item that was identified via a search using the configuration item search component 302 including an expansion widget associated with the identified configuration item, the configuration item in one level above the identified configuration item, and a configuration item selection widget associated with the identified configuration item. The controller is configured to cause the configuration item lock display component 306 to display an identifier for any selected configuration item and configured to provide in the user interface a lock initiation widget 316 that when selected initiates a process of locking each selected configuration item displayed in the configuration item lock display component 306. The identifier may include one or more attributes of the CI.

Figure 4:
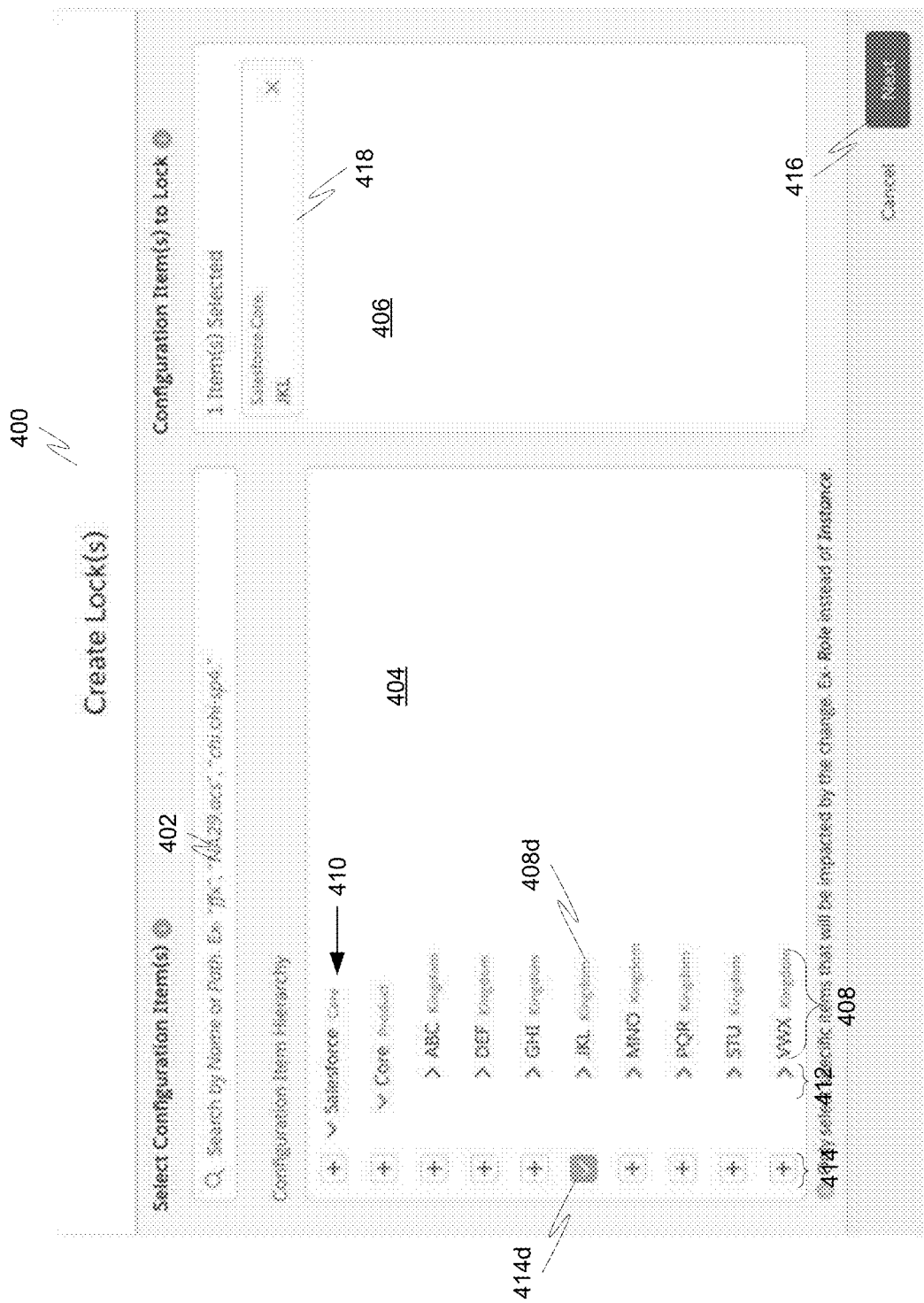
FIG. 4 is a diagram depicting another example user interface provided by a selection system for use by a service owner to select specific configuration items in a change management database having a hierarchical order, in accordance with some embodiments.

FIG. 4 is a diagram depicting another example user interface 400 provided by a selection system for use by a service owner to select specific configuration items in a change management database having a hierarchical order. Like the example user interface 300, the example user interface 400 includes a configuration item search component 402, a configuration item hierarchy display component 404, a configuration item lock display component 406, a display of configuration items 408 in hierarchical order beginning with the top level 410 of the hierarchy, an expansion widget 412 associated with each configuration item 408, a configuration item selection widget 414 associated with each configuration item 408, and a lock initiation widget 416.

In this example, the controller causes a visual indication (e.g., a check mark) to be displayed by a specific configuration item selection widget 414d that indicates that the associated configuration item 408d has been selected to be locked and causes an identifier 418 for the selected configuration item to be displayed in the configuration item lock display component 406.

Figure 5A:
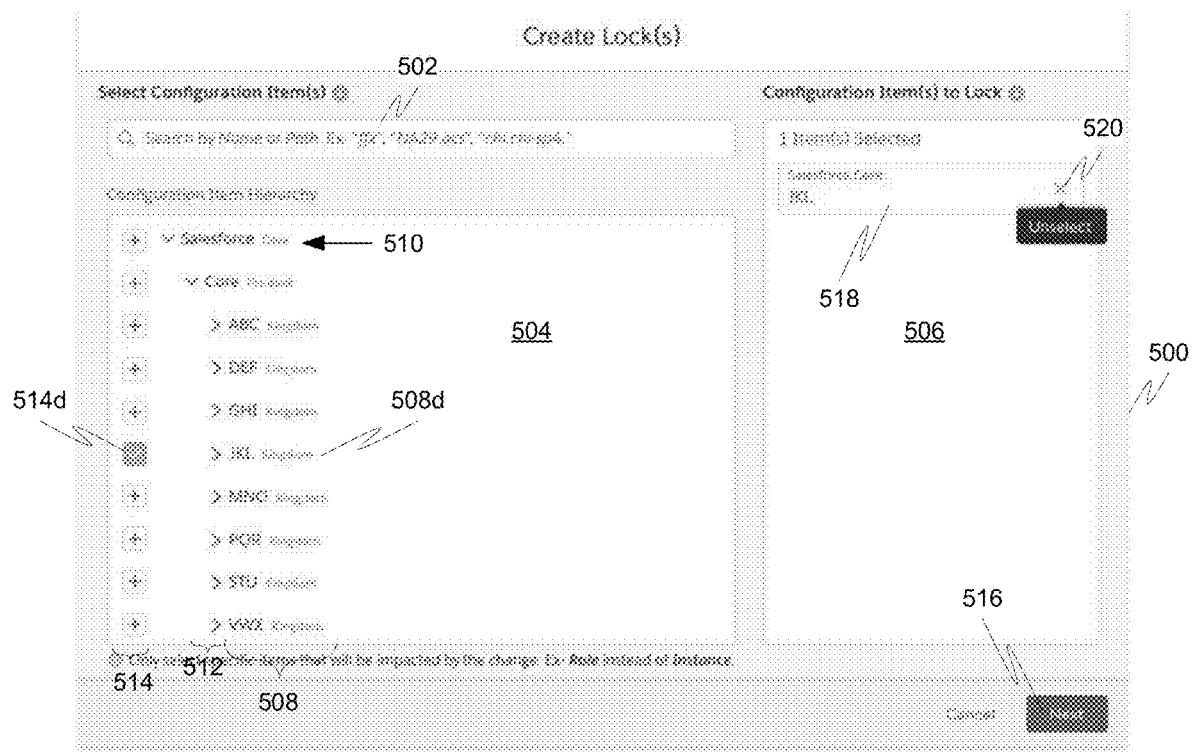
FIGS. 5A and 5B are diagrams depicting a selected state and an unselected state of an example user interface provided by a selection system for use by a service owner to select specific configuration items in a change management database having a hierarchical order, in accordance with some embodiments.
Figure 5B:
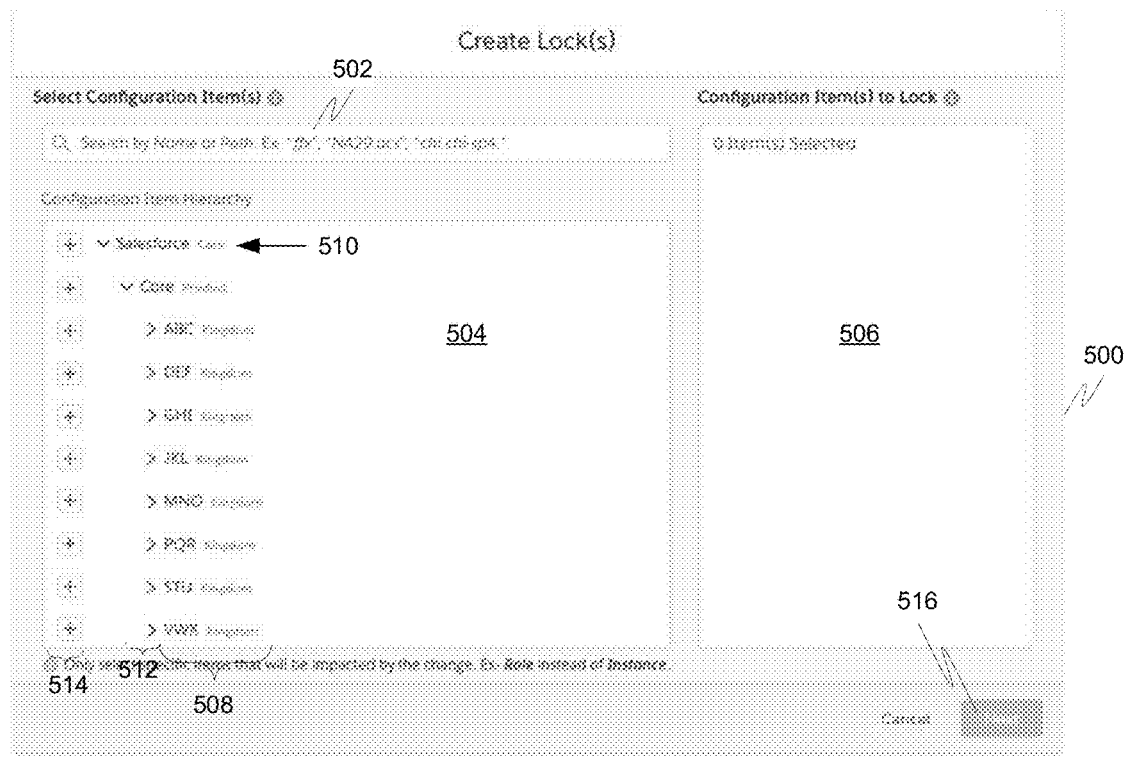

FIGS. 5A and 5B are diagrams depicting a selected state and an unselected state of an example user interface 500 provided by a selection system for use by a service owner to select specific configuration items in a change management database having a hierarchical order. Like the example user interface 300, the example user interface 500 includes a configuration item search component 502, a configuration item hierarchy display component 504, a configuration item lock display component 506, a display of configuration items 508 in hierarchical order beginning with the top level 510 of the hierarchy, an expansion widget 512 associated with each configuration item 508, a configuration item selection widget 514 associated with each configuration item 508, and a lock initiation widget 516.

In this example of FIG. 5A, the controller causes a visual indication (e.g., a check mark) to be displayed by a specific configuration item selection widget 514d that indicates that the associated configuration item 508d has been selected to be locked and causes an identifier 518 for the selected configuration item to be displayed in the configuration item lock display component 506. The identifier 518 for the selected configuration item displayed in the configuration item lock display component 506 also includes an unselect widget 520 that when selected causes the associated selected configuration item to be unselected.

The example of FIG. 5B, illustrates that after the unselect widget 520 has been selected the user interface 500 no longer displays a visual indication (e.g., a check mark) by the previously selected configuration item selection widget indicating that an associated configuration item has been selected to be locked and no longer displays an identifier for the previously selected then unselected configuration item in the configuration item lock display component 506.

Figure 6:
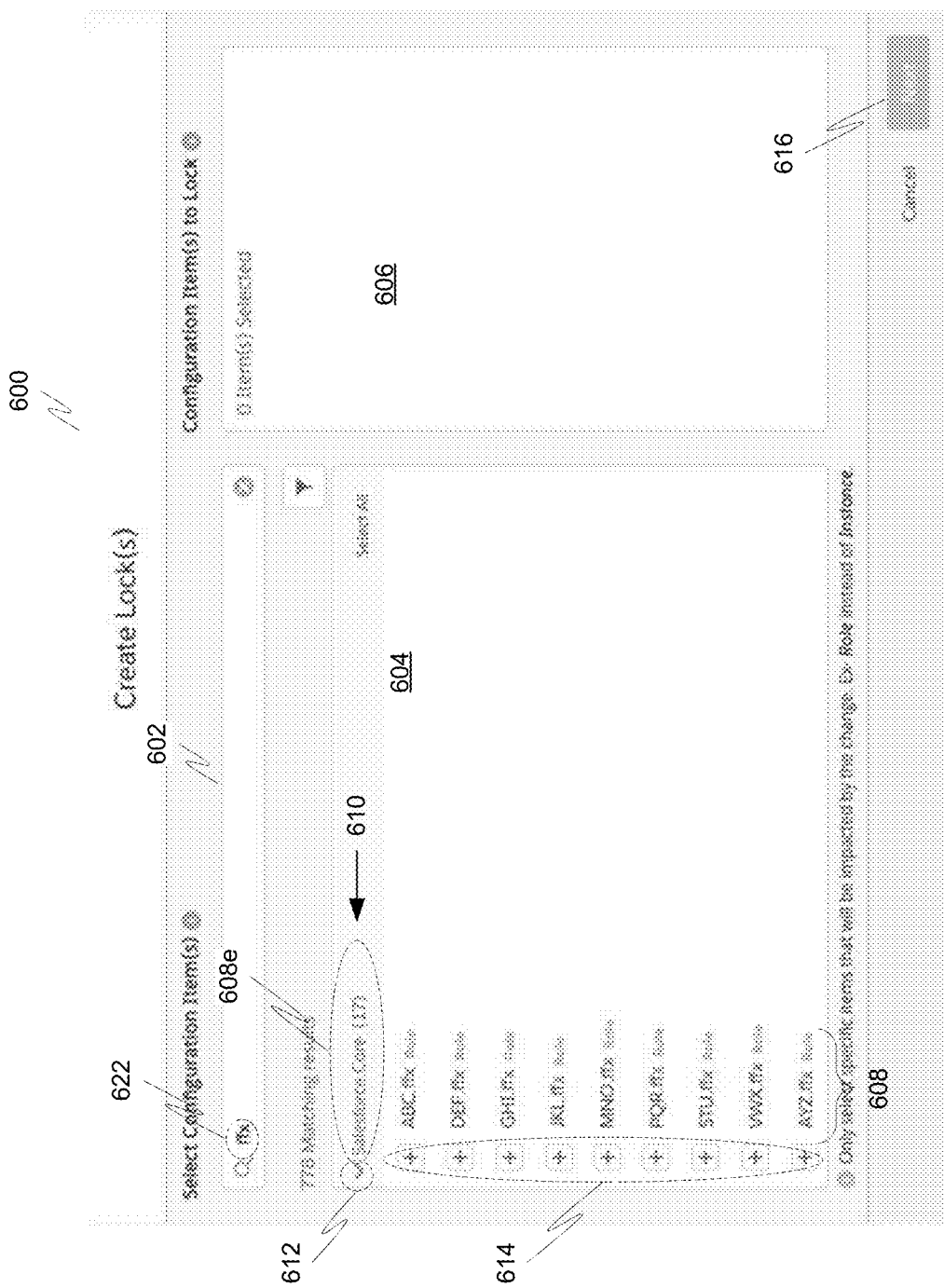
FIG. 6 is a diagram depicting an example display of search results in a user interface provided by a selection system for use by a service owner to select specific configuration items in a change management database having a hierarchical order, in accordance with some embodiments.

FIG. 6 is a diagram depicting an example display of search results in a user interface 600 provided by a selection system for use by a service owner to select specific configuration items in a change management database having a hierarchical order. Like the example user interface 300, the example user interface 600 includes a configuration item search component 602, a configuration item hierarchy display component 604, a configuration item lock display component 606, a display of configuration items 608 in hierarchical order beginning with a higher level of the hierarchy, an expansion widget 612 associated with a higher level configuration item 608e, a configuration item selection widget 614 associated with a plurality of configuration items 608, and a lock initiation widget 616.

In this example, the controller has received a search term (e.g., ffx) 622 entered via the configuration item search component 602, displayed the received search term 622 in the configuration item search component 602, and initiated a search for a configuration item corresponding to the search term 622 within the change management database. A search conducted based on the search term has identified a plurality of configuration items 608 matching the search term 622 and the controller has caused a plurality of matching configuration items 608 to be displayed in the configuration item display component 604 including the configuration item 608e in one level above the matching configuration items 608, and a configuration item selection widget 614 associated with each matching configuration item. The controller has grouped the search results based on the common higher level CI in their hierarchy in the database.

Figure 7A:
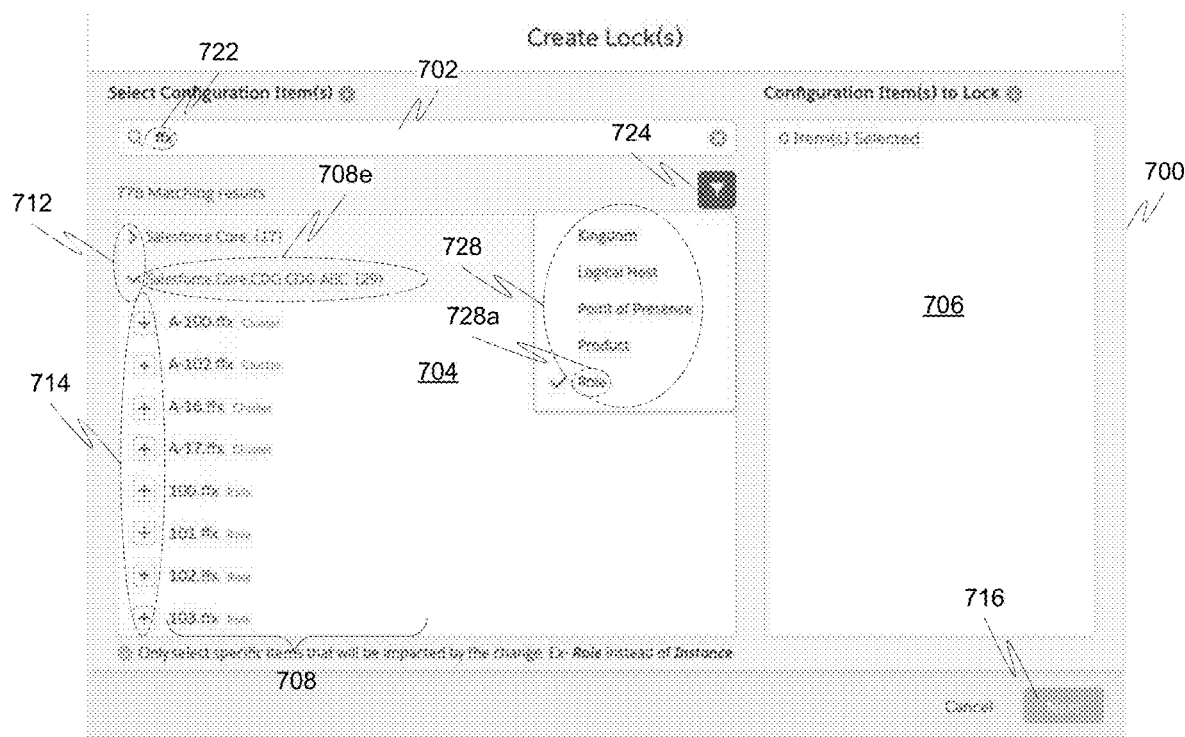
FIGS. 7A and 7B are diagrams depicting an example application of a filter to narrow the display of search results in an example user interface provided by a selection system for use by a service owner to select specific configuration items in a change management database having a hierarchical order, in accordance with some embodiments.
Figure 7B:
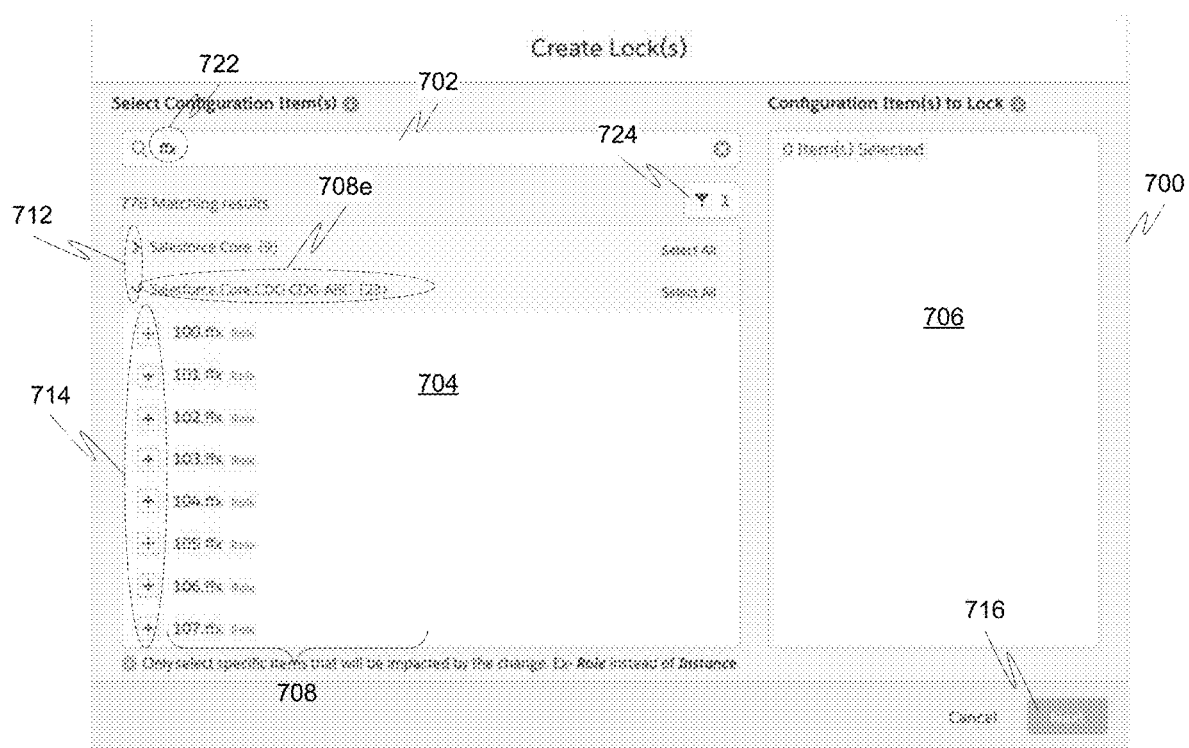

FIGS. 7A and 7B are diagrams depicting an example application of a filter to narrow the display of search results in an example user interface 700 provided by a selection system for use by a service owner to select specific configuration items in a change management database having a hierarchical order. Like the example user interface 300, the example user interface 700 includes a configuration item search component 702, a configuration item hierarchy display component 704, a configuration item lock display component 706, a display of configuration items 708 in hierarchical order, a configuration item selection widget 714 associated with a plurality of configuration items 708, and a lock initiation widget 716.

In the example of FIG. 7A, the controller has received a search term (e.g., ffx) 722 entered via the configuration item search component 702, displayed the received search term 722 in the configuration item search component 702, and initiated a search for a configuration item corresponding to the search term 722 within the change management database. A search conducted based on the search term has identified a plurality of configuration items 708 matching the search term 722 and the controller has caused a plurality of matching configuration items 708 to be displayed in the configuration item display component 704 including the configuration item 708e in one level above the matching configuration items 708, and a configuration item selection widget 714 associated with each matching configuration item.

The controller has caused a filter widget 724 to be displayed in the user interface that when selected caused a mini-component 726 to be displayed that includes a plurality of filter selection options 728 wherein when one (728a) of the filter selection options 728 is selected the controller filters the search results using criteria specified by the selected filter selection option 728a and displays the filtered search results in the configuration item hierarchy display component 704.

In the example of FIG. 7B, the controller has received a search term (e.g., ffx) 722 entered via the configuration item search component 702, displayed the received search term 722 in the configuration item search component 702, and initiated a search for a configuration item corresponding to the search term 722 within the change management database. A search conducted based on the search term has identified a plurality of configuration items 708 matching the search term 722 and the controller has caused a plurality of matching configuration items 708, the configuration item 708e in one level above the identified configuration items 708, and a configuration item selection widget 714 associated with each matching configuration item to be displayed. The controller has also received the selection of one of the filter selection options 728, filtered the search results using criteria specified by the selected filter selection option 728a, and caused the filtered search results to be displayed in the configuration item hierarchy display component 704. The controller has also caused the filter widget 724 to display the number of filters (e.g., 1) that has been applied to the search results displayed in the configuration item display component 704.

Figure 8:
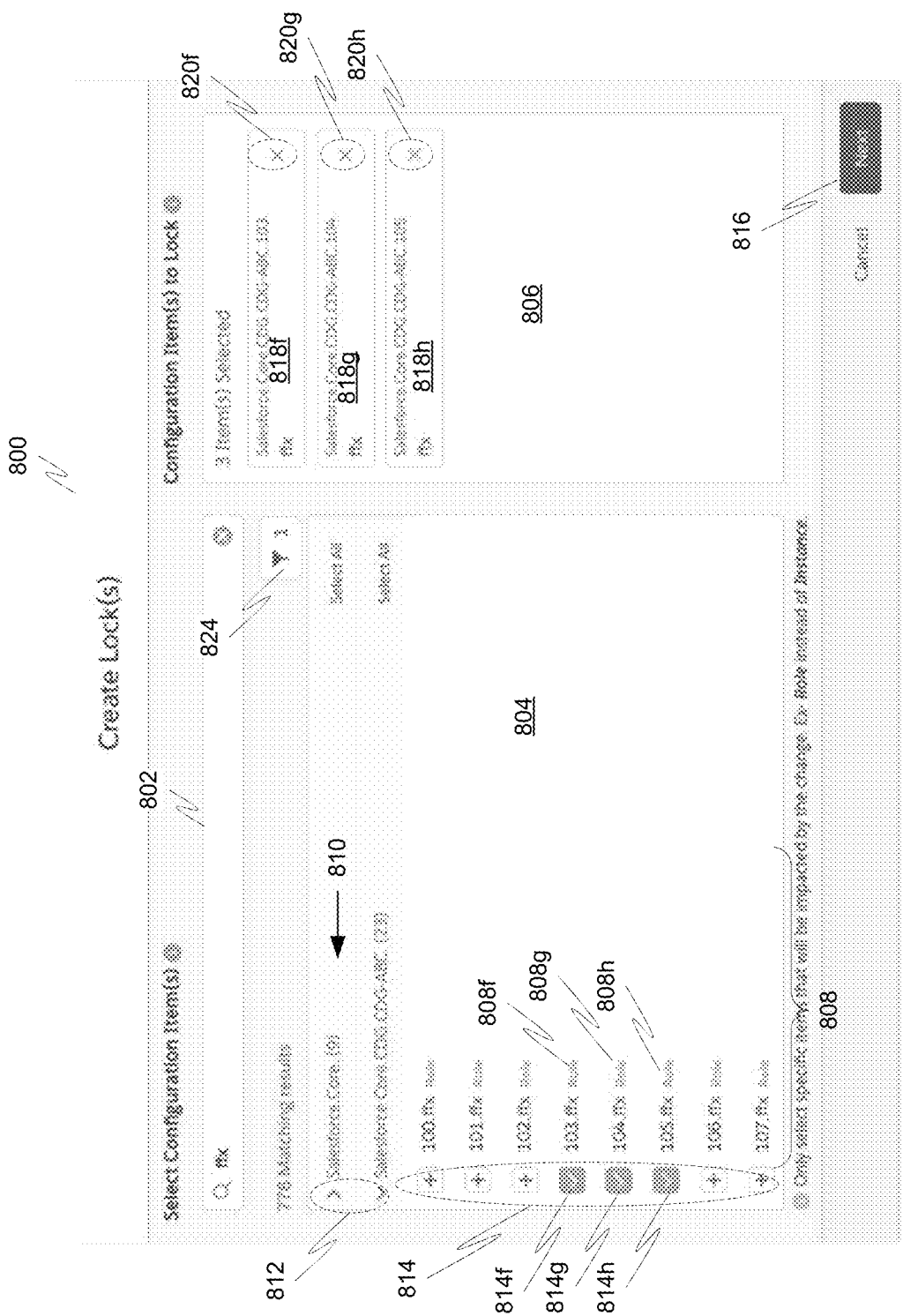
FIG. 8 is a diagram depicting an example display of configuration items selected by a service owner in an example user interface provided by a selection system for use by a service owner to select specific configuration items in a change management database having a hierarchical order, in accordance with some embodiments.

FIG. 8 is a diagram depicting an example display of configuration items selected by a service owner in an example user interface 800 provided by a selection system for use by a service owner to select specific configuration items in a change management database having a hierarchical order. Like the example user interface 300, the example user interface 800 includes a configuration item search component 802, a configuration item hierarchy display component 804, a configuration item lock display component 806, a display of configuration items 808 in hierarchical order beginning with the top level 810 of the hierarchy, an expansion widget 812 associated with each configuration item 808 for which expansion is possible, a configuration item selection widget 814 associated with a plurality of configuration items 808, and a lock initiation widget 816.

In this example, a plurality of configuration items 808f, 808g, 808h have been selected and their selection indicated by the plurality of marked configuration item selection widgets 814f, 814g, 814h in the configuration item hierarchy display component 804. The controller also caused an identifier 818f, 818g, 818h for the selected configuration items to be displayed in the configuration item lock display component 806. Any of the selected configuration items 808f, 808g, 808h can be deselected either through deselection via configuration item selection widgets 814f, 814g, 814h and/or unselect widgets 820f, 820g, 820h associated with the identifiers 818f, 818g, 818h. The controller has also caused the filter widget 824 to display the number of filters (e.g., 1) that has been applied to the search results displayed in the configuration item display component 804.

Figure 9:
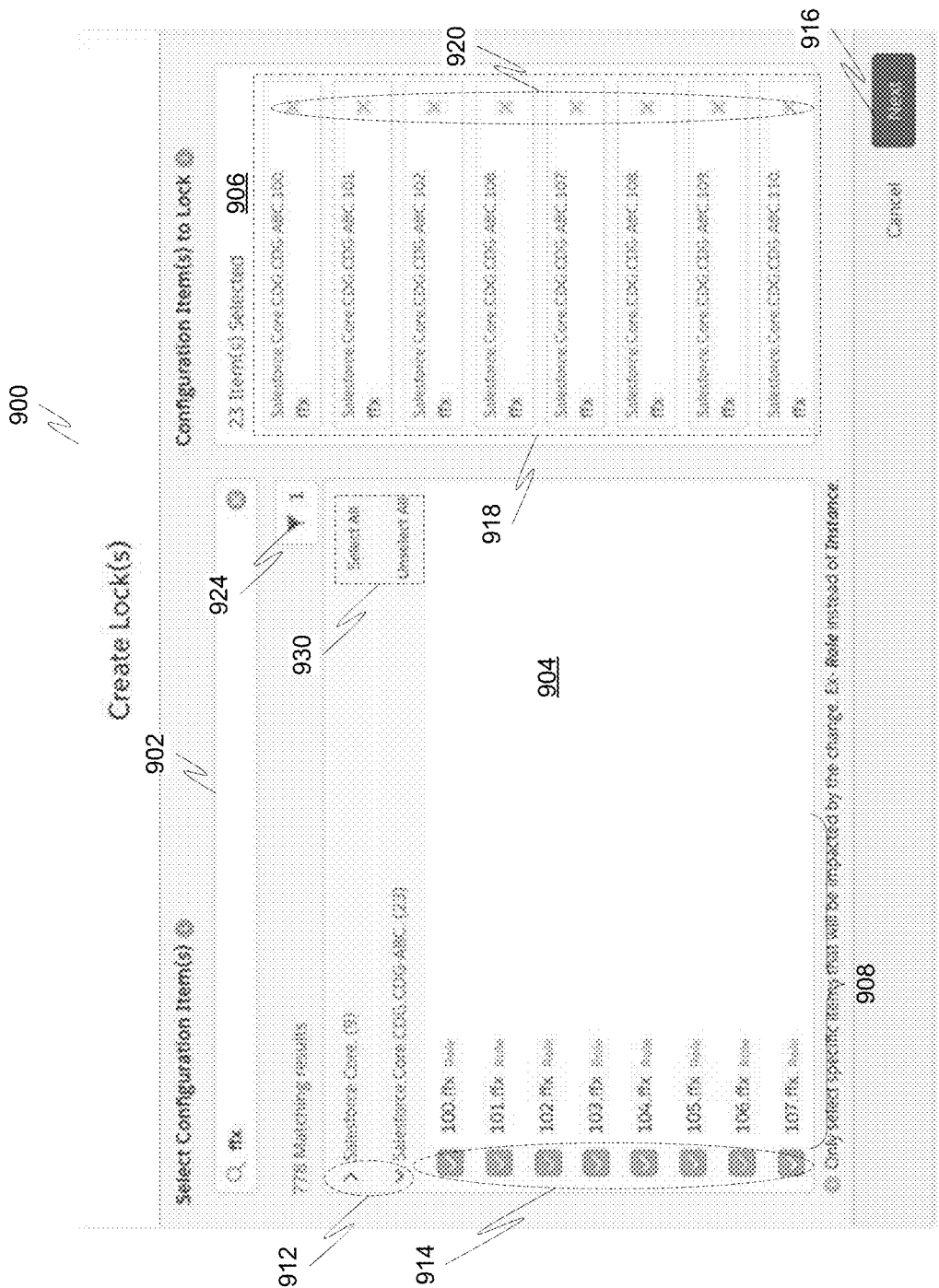
FIG. 9 is a diagram depicting an example display of the use of a 'Select All' option to select all configuration items in a group in an example user interface provided by a selection system for use by a service owner to select specific configuration items in a change management database having a hierarchical order, in accordance with some embodiments.

FIG. 9 is a diagram depicting an example display of the use of a 'Select All' option to select all configuration items in a group in an example user interface 900 provided by a selection system for use by a service owner to select specific configuration items in a change management database having a hierarchical order. Like the example user interface 300, the example user interface 900 includes a configuration item search component 902, a configuration item hierarchy display component 904, a configuration item lock display component 906, a display of configuration items 908 in hierarchical order, an expansion widget 912, a configuration item selection widget 914 associated with a plurality of configuration items 908, and a lock initiation widget 916.

In this example, a plurality of configuration items 908 have been selected and their selection indicated by the plurality of marked configuration item selection widgets 914 in the configuration item hierarchy display component 904. The controller also caused the identifier 918 for the selected configuration items to be displayed in the configuration item lock display component 906. Any of the selected configuration items 908 can be deselected individually through deselection via configuration item selection widgets 914 and/or unselect widgets 920. A plurality may be selected via the select/unselect all widget 930 associated with the higher level configuration item when the select/unselect all widget 930 is in a select state. Similarly, a plurality may be unselected via the select/unselect all widget 930 associated with the higher level configuration item when the select/unselect all widget 930 is in a unselect state. The controller has also caused the filter widget 924 to display the number of filters (e.g., 1) that has been applied to the search results displayed in the configuration item display component 904.

Through the user interfaces 300, 400, 500, 600, 700, 800, 900, the controller can allow a service owner to search for and select for locking any of the multitude of configuration items representative of hardware and software elements in the infrastructure of the computing system.

Figure 10:
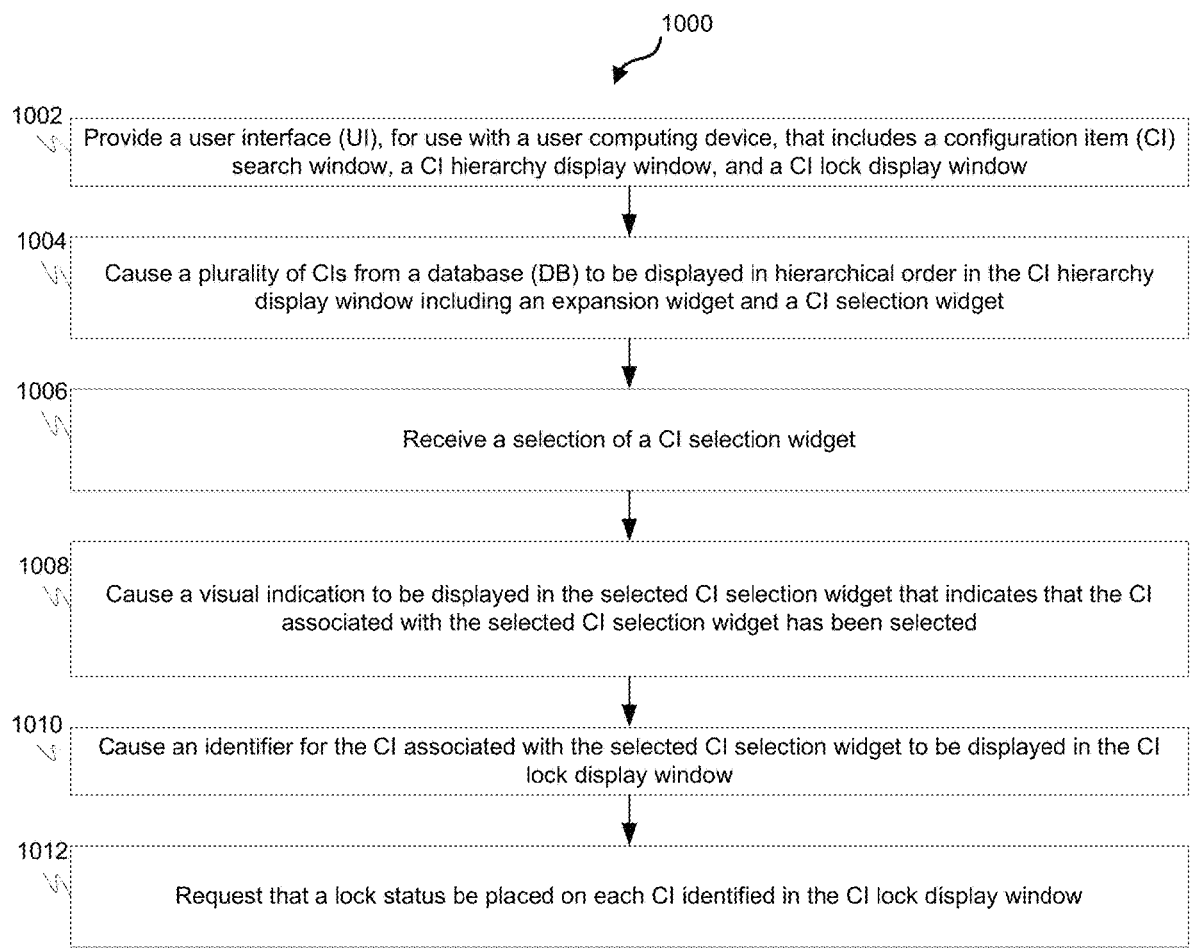
FIG. 10 is a process flow chart depicting an example process in a selection system for use by a service owner to select specific configuration items in a change management database having a hierarchical order, in accordance with some embodiments.

FIG. 10 is a process flow chart depicting an example process 1000 in a selection system for use by a service owner to select specific configuration items in a change management database having a hierarchical order. The order of operation within the example process 1000 is not limited to the sequential execution as illustrated in the figure, but may be performed in one or more varying orders as applicable and in accordance with the present disclosure.

The example process 1000 includes providing a user interface (UI), for use with a user computing device, that includes a configuration item (CI) search component, a CI hierarchy display component, and a CI lock display component (operation 1002).

The example process 1000 includes causing a plurality of CIs from a database (DB) to be displayed in hierarchical order in the CI hierarchy display component including an expansion widget and a CI selection widget (operation 1004). The display includes a top level of the hierarchy, an expansion widget for each displayed CI that is in a hierarchical path of a lower level CI wherein each expansion widget when selected causes the next level of CIs in the hierarchy below the CI associated with the expansion widget to be displayed within the CI display component and when unselected prevents the next level of CIs below the CI associated with the expansion widget from being displayed, and a CI selection widget for each displayed CI wherein each CI selection widget when selected displays a visual indication that indicates that the CI associated with the selected CI selection widget has been selected and causes an identifier for the CI associated with the selected CI selection widget to be displayed in the CI lock display component. The DB may comprise a change management database that includes a hierarchy of CIs, wherein each CI represents a hardware or service module within the infrastructure of a computing system on which a change is desired to be implemented.

The example process 1000 includes receiving a selection of a CI selection widget (operation 1006). The receiving a selection of a CI selection widget may include: receiving a request to scroll through a hierarchical path from a higher level CI to a lower level CI through the selection of one or more expansion widgets; providing a display of CIs in the hierarchical path in the CI hierarchy display component; and receiving the selection of a CI in the hierarchical path via a selection widget associated with the selected CI. The receiving a selection of a CI selection widget may include: receiving a selection of an expansion widget; causing a lower level CI having a hierarchical path that includes the CI associated with the expansion widget to be displayed within the CI display component; and receiving the selection of the lower level CI.

The receiving a selection of a CI selection widget may include: receiving a search term via the via the CI search component of the UI; initiating a search for all CIs in the DB matching characteristics of the search term; causing one or more CIs matching characteristics of the search term to be displayed in hierarchical order in the CI hierarchy display component, wherein the display includes a CI in the level above a matching CI, an expansion widget for the CI in the level above the matching CI, and, when the expansion widget for the CI in the level above the matching CI is selected, the matching CI and a CI selection widget for the matching CI; and receiving the selection of one or more CIs matching characteristics of the search term.

The example process 1000 includes causing a visual indication to be displayed in the selected CI selection widget that indicates that the CI associated with the selected CI selection widget has been selected (operation 1008). The visual indication may be the display of a check mark or some other visual indication.

The example process 1000 includes causing an identifier for the CI associated with the selected CI selection widget to be displayed in the CI lock display component (operation 1010).

The identifier may include a listing of one or more attributes of the CI associated with the selected CI selection widget.

The example process 1000 includes requesting that a lock status be placed on each CI identified in the CI lock display component (operation 1012). Requesting that a lock status be placed on each CI identified in the CI lock display component may involve, for each CI identified in the CI lock display component: determining, responsive to the requesting that a lock status be placed on each CI identified in the CI lock display component, whether an active lock has been previously placed on the CI; when it is determined that an active lock has not been previously placed on the CI, placing the CI in a locked state; and when an active lock has been previously placed on the CI, providing a notification that the CI is in a locked state. A lock initiation widget may be provided in the user interface that when selected initiates the requesting that a lock status be placed on each CI identified in the CI lock display component.

The subject matter described herein discloses apparatus, systems, techniques and articles for enabling faster selection of CI(s)—may allow users to search for and select CIs faster. The subject matter described herein discloses apparatus, systems, techniques and articles for enabling increased change velocity in a computing system—can allow users to select multiple CIs accurately preventing unnecessary resources from being locked in the infrastructure for change execution and enabling more changes to be implemented simultaneously. The subject matter described herein discloses apparatus, systems, techniques and articles for reducing the number of customer impacting incidents—can provide better tooling for managing changes. The subject matter described herein discloses apparatus, systems, techniques and articles that enables selection of CIs from a CMDB hierarchy.

The subject matter described herein discloses apparatus, systems, techniques and articles that enable result grouping based on hierarchy by finding, from all the search results of configuration items using the CI Path of the CIs, the deepest level in the hierarchy that is common among multiple results and grouping the CIs based on that common hierarchy level. By using this technique, all the results can be dynamically grouped by different levels of hierarchy that have Configuration Items in the search results. For example, as illustrated in FIGS. 7A, 7B, 8, and 9, in the example search using the search term "ffx", the search results were grouped based on hierarchy. In these illustrations, 9 CIs having a common hierarchy level were grouped under Salesforce.Core and 23 CIs having a common hierarchy level were grouped under Salesforce. Core. CDG. CDG-ABC.

The subject matter described herein discloses apparatus, systems, techniques and articles that enable navigation through a hierarchy. The subject matter described herein discloses apparatus, systems, techniques and articles that enables filtering of search results. The subject matter described herein discloses apparatus, systems, techniques and articles that enables individual or group (e.g., Select All) selection or deselection of CIs identified through navigation through the hierarchy or identified through searches.

In one embodiment, a selection system for selecting specific configuration items in a database (DB) of items having a hierarchical order is provided. The selection system comprises a controller configured to: provide a user interface (UI) for use with a user computing device, wherein the UI comprises a configuration item (CI) search component, a CI hierarchy display component, and a CI lock display component; cause a plurality of CIs from the DB to be displayed in hierarchical order in the CI hierarchy display component, including a top level of the hierarchy, an expansion widget for each displayed CI that is in a hierarchical path of a lower level CI wherein each expansion widget when selected causes the next level of CIs in the hierarchy below the CI associated with the expansion widget to be displayed within the CI display component and when unselected prevents the next level of CIs below the CI associated with the expansion widget from being displayed, and a CI selection widget for each displayed CI wherein each CI selection widget when selected displays a visual indication that indicates that the CI associated with the selected CI selection widget has been selected and causes an identifier for the CI associated with the selected CI selection widget to be displayed in the CI lock display component; receive a selection of a CI selection widget; cause a visual indication to be displayed in the selected CI selection widget that indicates that the CI associated with the selected CI selection widget has been selected; cause an identifier for the CI associated with the selected CI selection widget to be displayed in the CI lock display component; and request that a lock status be placed on each CI identified in the CI lock display component.

These aspects and other embodiments may include one or more of the following features. To receive a selection of a CI selection widget the controller may be configured to: receive a request to scroll through a hierarchical path from a higher level CI to a lower level CI through the selection of one or more expansion widgets; provide a display of CIs in the hierarchical path in the CI hierarchy display component; and receive the selection of a CI in the hierarchical path via a selection widget associated with the selected CI. The controller may be further configured to: receive a selection of an expansion widget; and cause a lower level CI having a hierarchical path that includes the CI associated with the expansion widget to be displayed within the CI display component. The controller may be further configured to: receive a search term via the CI search component of the UI; initiate a search for all CIs in the DB matching characteristics of the search term; and cause one or more CIs matching characteristics of the search term to be displayed in hierarchical order in the CI hierarchy display component The display includes a CI in the level above a matching CI, an expansion widget for the CI in the level above the matching CI, and, when the expansion widget for the CI in the level above the matching CI may be selected, the matching CI and a CI selection widget for the matching CI. The DB may comprise a change management database comprising a hierarchy of CIs, wherein each CI represents a hardware or service module within the infrastructure of a computing system on which a change may be desired to be implemented. The system, wherein for each CI identified in the CI lock display component the controller may be configured to: determine, responsive to the request that a lock status be placed on each CI identified in the CI lock display component, whether an active lock has been previously placed on the CI; when it may be determined that an active lock has not been previously placed on the CI, place the CI in a locked state; and when an active lock has been previously placed on the CI, provide a notification that the CI may be in a locked state. The controller may be further configured to provide, in the user interface, a lock initiation widget that when selected initiates the request that a lock status be placed on each CI identified in the CI lock display component.

In another embodiment, a processor-implemented method of selecting specific configuration items in a database (DB) of items having a hierarchical order is provided. The method comprises: providing, by a processor, a user interface (UI) for use with a user computing device, wherein the UI comprises a configuration item (CI) search component, a CI hierarchy display component, and a CI lock display component; causing, by the processor, a plurality of CIs from the DB to be displayed in hierarchical order in the CI hierarchy display component, including a top level of the hierarchy, an expansion widget for each displayed CI that is in a hierarchical path of a lower level CI wherein each expansion widget when selected causes the next level of CIs in the hierarchy below the CI associated with the expansion widget to be displayed within the CI display component and when unselected prevents the next level of CIs below the CI associated with the expansion widget from being displayed, and a CI selection widget for each displayed CI wherein each CI selection widget when selected displays a visual indication that indicates that the CI associated with the selected CI selection widget has been selected and causes an identifier for the CI associated with the selected CI selection widget to be displayed in the CI lock display component; receiving, by the processor, a selection of a CI selection widget; causing, by the processor, a visual indication to be displayed in the selected CI selection widget that indicates that the CI associated with the selected CI selection widget has been selected; causing, by the processor, an identifier for the CI associated with the selected CI selection widget to be displayed in the CI lock display component; and requesting, by the processor, that a lock status be placed on each CI identified in the CI lock display component.

These aspects and other embodiments may include one or more of the following features. The receiving a selection of a CI selection widget may comprise: receiving a request to scroll through a hierarchical path from a higher level CI to a lower level CI through the selection of one or more expansion widgets; providing a display of CIs in the hierarchical path in the CI hierarchy display component; and receiving the selection of a CI in the hierarchical path via a selection widget associated with the selected CI. The method may further comprise: receiving, by the processor, a selection of an expansion widget; and causing, by the processor, a lower level CI having a hierarchical path that includes the CI associated with the expansion widget to be displayed within the CI display component. The method may further comprise: receiving, by the processor, a search term via the via the CI search component of the UI; initiating, by the processor, a search for all CIs in the DB matching characteristics of the search term; and causing, by the processor, one or more CIs matching characteristics of the search term to be displayed in hierarchical order in the CI hierarchy display component wherein the display includes a CI in the level above a matching CI, an expansion widget for the CI in the level above the matching CI, and, when the expansion widget for the CI in the level above the matching CI is selected, the matching CI and a CI selection widget for the matching CI. The DB may comprise a change management database comprising a hierarchy of CIs, wherein each CI represents a hardware or service module within the infrastructure of a computing system on which a change is desired to be implemented. The method may further comprise for each CI identified in the CI lock display component: determining, responsive to the requesting that a lock status be placed on each CI identified in the CI lock display component, whether an active lock has been previously placed on the CI; when it is determined that an active lock has not been previously placed on the CI, placing the CI in a locked state; and when an active lock has been previously placed on the CI, providing a notification that the CI is in a locked state. The method may further comprise providing, by the processor in the user interface, a lock initiation widget that when selected initiates the requesting, by the processor, that a lock status be placed on each CI identified in the CI lock display component.

In another embodiment, non-transitory computer readable media encoded with programming instructions configurable to cause one or more processors to perform a method of selecting specific configuration items in a database (DB) of items having a hierarchical order is provided. The method comprises: providing, by a processor, a user interface (UI) for use with a user computing device, wherein the UI comprises a configuration item (CI) search component, a CI hierarchy display component, and a CI lock display component; causing, by the processor, a plurality of CIs from the DB to be displayed in hierarchical order in the CI hierarchy display component, including a top level of the hierarchy, an expansion widget for each displayed CI that is in a hierarchical path of a lower level CI wherein each expansion widget when selected causes the next level of CIs in the hierarchy below the CI associated with the expansion widget to be displayed within the CI display component and when unselected prevents the next level of CIs below the CI associated with the expansion widget from being displayed, and a CI selection widget for each displayed CI wherein each CI selection widget when selected displays a visual indication that indicates that the CI associated with the selected CI selection widget has been selected and causes an identifier for the CI associated with the selected CI selection widget to be displayed in the CI lock display component; receiving, by the processor, a selection of a CI selection widget; causing, by the processor, a visual indication to be displayed in the selected CI selection widget that indicates that the CI associated with the selected CI selection widget has been selected; causing, by the processor, an identifier for the CI associated with the selected CI selection widget to be displayed in the CI lock display component; and requesting, by the processor, that a lock status be placed on each CI identified in the CI lock display component.

These aspects and other embodiments may include one or more of the following features. The receiving a selection of a CI selection widget may comprise: receiving a request to scroll through a hierarchical path from a higher level CI to a lower level CI through the selection of one or more expansion widgets; providing a display of CIs in the hierarchical path in the CI hierarchy display component; and receiving the selection of a CI in the hierarchical path via a selection widget associated with the selected CI. The method may further comprise: receiving, by the processor, a selection of an expansion widget; and causing, by the processor, a lower level CI having a hierarchical path that includes the CI associated with the expansion widget to be displayed within the CI display component. The method may further comprise: receiving, by the processor, a search term via the via the CI search component of the UI; initiating, by the processor, a search for all CIs in the DB matching characteristics of the search term; and causing, by the processor, one or more CIs matching characteristics of the search term to be displayed in hierarchical order in the CI hierarchy display component wherein the display includes a CI in the level above a matching CI, an expansion widget for the CI in the level above the matching CI, and, when the expansion widget for the CI in the level above the matching CI is selected, the matching CI and a CI selection widget for the matching CI. The DB may comprise a change management database comprising a hierarchy of CIs, wherein each CI represents a hardware or service module within the infrastructure of a computing system on which a change is desired to be implemented. The method may further comprise for each CI identified in the CI lock display component: determining, responsive to the requesting that a lock status be placed on each CI identified in the CI lock display component, whether an active lock has been previously placed on the CI; when it is determined that an active lock has not been previously placed on the CI, placing the CI in a locked state; and when an active lock has been previously placed on the CI, providing a notification that the CI is in a locked state. The method may further comprise providing, by the processor in the user interface, a lock initiation widget that when selected initiates the requesting, by the processor, that a lock status be placed on each CI identified in the CI lock display component.

In another embodiment, a selection system for selecting specific configuration items in a database (DB) of items having a hierarchical order is provided. The selection system comprises a controller configured to: provide a user interface (UI) for use with a user computing device, wherein the UI comprises a configuration item (CI) search component, a CI hierarchy display component, and a CI lock display component; use the configuration item search component to: receive a search term via the via the CI search component of the UI; initiate a search for all CIs in the DB matching characteristics of the search term; and cause one or more CIs matching characteristics of the search term to be displayed in hierarchical order in the CI hierarchy display component. The controller is further configured to cause to be displayed in the CI hierarchy display component: a display of a plurality of CIs from the database DB in hierarchical order, including a top level of the hierarchy, an expansion widget for each displayed CI that is in a hierarchical path of a lower level CI wherein each expansion widget when selected causes the next level of CIs in the hierarchy below the CI associated with the expansion widget to be displayed within the CI display component and when unselected prevents the next level of CIs below the CI associated with the expansion widget from being displayed, and a CI selection widget for each displayed CI wherein each CI selection widget when selected displays a visual indication that indicates that the CI associated with the selected CI selection widget has been selected and causes an identifier for the CI associated with the selected CI selection widget to be displayed in the CI lock display component; and a display of one or more CIs matching characteristics of the search term in hierarchical order, wherein the display includes a CI in the level above a matching CI, an expansion widget for the CI in the level above the matching CI, and, when the expansion widget for the CI in the level above the matching CI is selected, the matching CI and a CI selection widget for the matching CI. The controller is further configured to cause an identifier for any CI associated with a selected CI selection widget to be displayed in the CI lock display component; and provide a lock initiation widget that when selected initiates a request that a lock status be placed on each CI identified in the CI lock display component.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" or "example" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A selection system for use with a cloud-based computing system that provides computing services to multiple tenants using common computer hardware and software, the selection system comprising:
    a change management database (DB) that includes a plurality of configuration items (CIs) arranged in a hierarchy, wherein each CI represents a hardware or service module within infrastructure of the cloud-based computing system on which a plurality of different service owners can implement changes; and
    a controller configured to control access to a hardware or software service module for change implementation by allowing a first service owner of the plurality of service owners to implement changes to the hardware or software service module while forbidding a second service owner from simultaneously implementing changes to the hardware or software service module, to control access the controller is configured to:
    provide a user interface (UI) for use with a user computing device, the UI comprising a configuration item (CI) search component, a CI hierarchy display component, and a CI lock display component;
    cause a plurality of CIs from the DB to be displayed in hierarchical order in the CI hierarchy display component, including a top level of the hierarchy, an expansion widget for each displayed CI that is in a hierarchical path of a lower level CI wherein each expansion widget when selected causes the next level of CIs in the hierarchy below the CI associated with the expansion widget to be displayed within the CI display component and when unselected prevents the next level of CIs below the CI associated with the expansion widget from being displayed, and a CI selection widget in the CI hierarchy display component for each displayed CI wherein each CI selection widget when selected changes state to display a visual indication that indicates that the CI associated with the selected CI selection widget has been selected and causes an identifier for the CI associated with the selected CI selection widget to be displayed in the CI lock display component;
    permit a plurality of CI selection widgets to simultaneously be in a selected state;
    receive a selection of a plurality of CI selection widgets from a user computing device of the first service owner;
    cause a visual indication to be simultaneously displayed in each of the plurality of selected CI selection widgets that indicates that the plurality of CIs associated with the plurality of selected CI selection widgets have been selected;
    cause an identifier for each of the plurality of CIs associated with the plurality of selected CI selection widgets to be simultaneously displayed in the CI lock display component; and
    request that a lock status be placed on each of the plurality of CIs identified in the CI lock display component, wherein when a CI identified in the CI lock display component is accessed in a second UI by a second service owner, a notification is provided via the second UI that the CI identified in the CI lock display component is in a locked state;
    wherein access to the hardware or software service module for change implementation is controlled by allowing the first service owner of the plurality of service owners to implement changes to the hardware or software service module while forbidding through a lock indication the second service owner from simultaneously implementing changes to the hardware or software service module.

2. The system of claim 1, wherein to receive a selection of a CI selection widget the controller is configured to:
    receive a request to scroll through a hierarchical path from a higher level CI to a lower level CI through the selection of one or more expansion widgets;
    provide a display of CIs in the hierarchical path in the CI hierarchy display component; and
    receive the selection of a CI in the hierarchical path via a selection widget associated with the selected CI.

3. The system of claim 1, wherein the controller is further configured to:
    receive a selection of an expansion widget; and
    cause a lower level CI having a hierarchical path that includes the CI associated with the expansion widget to be displayed within the CI display component.

4. The system of claim 3, wherein the controller is further configured to:
    receive a search term via the via the CI search component of the UI;
    initiate a search for all CIs in the DB matching characteristics of the search term; and
    cause one or more CIs matching characteristics of the search term to be displayed in hierarchical order in the CI hierarchy display component, wherein the display includes a CI in the level above a matching CI, an expansion widget for the CI in the level above the matching CI, and, when the expansion widget for the CI in the level above the matching CI is selected, the matching CI and a CI selection widget for the matching CI.

5. The system of claim 1, wherein for each CI identified in the CI lock display component the controller is configured to:
    determine, responsive to the request that a lock status be placed on each CI identified in the CI lock display component, whether an active lock has been previously placed on the CI;
    when it is determined that an active lock has not been previously placed on the CI, place the CI in a locked state; and
    when an active lock has been previously placed on the CI, provide a notification that the CI is in a locked state.

6. The system of claim 5, wherein the controller is further configured to provide, in the user interface, a lock initiation widget that when selected initiates the request that a lock status be placed on each CI identified in the CI lock display component.

7. The system of claim 1, wherein the controller is configured to provide a filter widget in the user interface that when selected causes a mini-component to be displayed that includes a plurality of filter selection options wherein when one of the filter selection options is selected the controller filters search results using criteria specified by the selected filter selection option and displays the filtered search results in the configuration item hierarchy display component.

8. The system of claim 1, wherein the controller is configured to provide in the UI a select/unselect all widget having a select-all component and an unselect-all component, wherein when the select-all component is selected the controller causes the CI selection widgets in the UI to be selected and display a visual indication that indicates that the CIs associated with the selected CI selection widgets have been selected and cause an identifier for the CIs associated with the selected CI selection widgets to be displayed in the CI lock display component; and when the unselect-all component is selected the controller causes the CI selection widgets in the UI to be unselected and to display a visual indication that indicates that the CIs associated with the unselected CI selection widgets are not selected and cause any identifiers for the CIs associated with the unselected CI selection widgets to be removed from display in the CI lock display component.

9. A processor-implemented method for use with a cloud-based computing system that provides computing services to multiple tenants using common computer hardware and software, the method comprising:

providing access to a change management database (DB) that includes a plurality of configuration items (CIs) arranged in a hierarchy, wherein each CI represents a hardware or service module within infrastructure of the cloud-based computing system on which a plurality of different service owners can implement changes;

providing, by a processor, a user interface (UI) for use with a user computing device, the UI comprising a configuration item (CI) search component, a CI hierarchy display component, and a CI lock display component;

causing, by the processor, a plurality of CIs from the DB to be displayed in hierarchical order in the CI hierarchy display component, including a top level of the hierarchy, an expansion widget for each displayed CI that is in a hierarchical path of a lower level CI wherein each expansion widget when selected causes the next level of CIs in the hierarchy below the CI associated with the expansion widget to be displayed within the CI display component and when unselected prevents the next level of CIs below the CI associated with the expansion widget from being displayed, and a CI selection widget in the CI hierarchy display component for each displayed CI wherein each CI selection widget when selected changes state to display a visual indication that indicates that the CI associated with the selected CI selection widget has been selected and causes an identifier for the CI associated with the selected CI selection widget to be displayed in the CI lock display component;

permitting a plurality of CI selection widgets to simultaneously be in a selected state;

receiving, by the processor, a selection of a plurality of CI selection widgets from a user computing device of a first service owner;

causing, by the processor, a visual indication to be simultaneously displayed in each of the plurality of selected CI selection widgets that indicates that the plurality of CIs associated with the plurality of selected CI selection widgets have been selected;

causing, by the processor, an identifier for each of the CIs associated with the selected plurality of CI selection widgets to be simultaneously displayed in the CI lock display component; and requesting, by the processor, that a lock status be placed on each of the plurality of CIs identified in the CI lock display component, wherein when a CI identified in the CI lock display component is accessed in a second UI by a second service owner, a notification is provided via the second UI that the CI identified in the CI lock display component is in a locked state;

wherein access to a hardware or software service module for change implementation is controlled by allowing the first service owner of the plurality of service owners to implement changes to the hardware or software service module while forbidding through a lock indication the second service owner from simultaneously implementing changes to the hardware or software service module.

10. The method of claim 9, wherein the receiving a selection of a CI selection widget comprises:

receiving a request to scroll through a hierarchical path from a higher level CI to a lower level CI through the selection of one or more expansion widgets;

providing a display of CIs in the hierarchical path in the CI hierarchy display component; and receiving the selection of a CI in the hierarchical path via a selection widget associated with the selected CI.

11. The method of claim 9, further comprising:

receiving, by the processor, a selection of an expansion widget; and causing, by the processor, a lower level CI having a hierarchical path that includes the CI associated with the expansion widget to be displayed within the CI display component.

12. The method of claim 11, further comprising:

receiving, by the processor, a search term via the via the CI search component of the UI;

initiating, by the processor, a search for all CIs in the DB matching characteristics of the search term; and causing, by the processor, one or more CIs matching characteristics of the search term to be displayed in hierarchical order in the CI hierarchy display component, wherein the display includes a CI in the level above a matching CI, an expansion widget for the CI in the level above the matching CI, and, when the expansion widget for the CI in the level above the matching CI is selected, the matching CI and a CI selection widget for the matching CI.

13. The method of claim 9, further comprising for each CI identified in the CI lock display component:

determining, responsive to the requesting that a lock status be placed on each CI identified in the CI lock display component, whether an active lock has been previously placed on the CI;

when it is determined that an active lock has not been previously placed on the CI, placing the CI in a locked state; and when an active lock has been previously placed on the CI, providing a notification that the CI is in a locked state.

14. The method of claim 13, further comprising providing, by the processor in the user interface, a lock initiation widget that when selected initiates the requesting, by the processor, that a lock status be placed on each CI identified in the CI lock display component.

15. The method of claim 9, further comprising providing a filter widget in the user interface that when selected causes a mini-component to be displayed that includes a plurality of filter selection options wherein when one of the filter selection options is selected the controller filters search results using criteria specified by the selected filter selection option and displays the filtered search results in the configuration item hierarchy display component.

16. The method of claim 9, further comprising providing in the UI a select/unselect all widget having a select-all component and an unselect-all component, wherein:

when the select-all component is selected, causing the CI selection widgets in the UI to be selected, displaying a visual indication that indicates that the CIs associated with the selected CI selection widgets have been selected, and causing an identifier for the CIs associated with the selected CI selection widgets to be displayed in the CI lock display component; and when the unselect-all component is selected, causing the CI selection widgets in the UI to be unselected, displaying a visual indication that indicates that the CIs associated with the unselected CI selection widgets are not selected, and causing any identifiers for the CIs associated with the unselected CI selection widgets to be removed from display in the CI lock display component.

17. Non-transitory computer readable media encoded with programming instructions configurable to cause one or more processors to perform a method for use with a cloud-based computing system that provides computing services to multiple tenants using common computer hardware and software, the method comprising:

providing access to a change management database (DB) that includes a plurality of configuration items (CIs) arranged in a hierarchy, wherein each CI represents a hardware or service module within infrastructure of the cloud-based computing system on which a plurality of different service owners can implement changes;

providing a user interface (UI) for use with a user computing device, the UI comprising a configuration item (CI) search component, a CI hierarchy display component, and a CI lock display component;

causing a plurality of CIs from the DB to be displayed in hierarchical order in the CI hierarchy display component, including a top level of the hierarchy, an expansion widget for each displayed CI that is in a hierarchical path of a lower level CI wherein each expansion widget when selected causes the next level of CIs in the hierarchy below the CI associated with the expansion widget to be displayed within the CI display component and when unselected prevents the next level of CIs below the CI associated with the expansion widget from being displayed, and a CI selection widget in the CI hierarchy display component for each displayed CI wherein each CI selection widget when selected changes state to display a visual indication that indicates that the CI associated with the selected CI selection widget has been selected and causes an identifier for the CI associated with the selected CI selection widget to be displayed in the CI lock display component;

permitting a plurality of CI selection widgets to simultaneously be in a selected state;

receiving a selection of a plurality of CI selection widgets from a user computing device of a first service owner;

causing a visual indication to be simultaneously displayed in each of the plurality of selected CI selection widgets that indicates that the plurality of CIs associated with the plurality of selected CI selection widgets have been selected;

causing an identifier for each of the CIs associated with the selected plurality of CI selection widgets to be simultaneously displayed in the CI lock display component; and requesting that a lock status be placed on each of the plurality of CIs identified in the CI lock display component, wherein when a CI identified in the CI lock display component is accessed in a second UI by a second service owner, a notification is provided via the second UI that the CI identified in the CI lock display component is in a locked state;

wherein access to a hardware or software service module for change implementation is controlled by allowing the first service owner of the plurality of service owners to implement changes to the hardware or software service module while forbidding through a lock indication the second service owner from simultaneously implementing changes to the hardware or software service module.

18. The non-transitory computer readable media of claim 17, wherein the receiving a selection of a CI selection widget comprises:

receiving a request to scroll through a hierarchical path from a higher level CI to a lower level CI through the selection of one or more expansion widgets;

providing a display of CIs in the hierarchical path in the CI hierarchy display component; and receiving the selection of a CI in the hierarchical path via a selection widget associated with the selected CI.

19. The non-transitory computer readable media of claim 17, wherein the method further comprises providing a filter widget in the user interface that when selected causes a mini-component to be displayed that includes a plurality of filter selection options wherein when one of the filter selection options is selected the controller filters search results using criteria specified by the selected filter selection option and displays the filtered search results in the configuration item hierarchy display component.

20. The non-transitory computer readable media of claim 17, wherein the method further comprises providing in the UI a select/unselect all widget having a select-all component and an unselect-all component, wherein:

when the select-all component is selected, causing the CI selection widgets in the UI to be selected, displaying a visual indication that indicates that the CIs associated with the selected CI selection widgets have been selected, and causing an identifier for the CIs associated with the selected CI selection widgets to be displayed in the CI lock display component; and when the unselect-all component is selected, causing the CI selection widgets in the UI to be unselected, displaying a visual indication that indicates that the CIs associated with the unselected CI selection widgets are not selected, and causing any identifiers for the CIs associated with the unselected CI selection widgets to be removed from display in the CI lock display component.

* * * * *